UNITED STATES PATENT OFFICE

WILLIAM G. LEAMON, OF NEW YORK, N. Y.

PROCESS OF TREATING OILS

No Drawing. Application filed June 26, 1925, Serial No. 39,744. Renewed April 2, 1929.

This invention relates to processes of treating oils; and it relates more particularly to treatment of mineral oils such as petroleum, petroleum distillates and residues, in the manufacture of valuable commercial products. The invention is especially applicable to the treatment of gasolines and other motor fuels derived from petroleum, as well as other relatively light distillates, such as kerosenes, said treatment being effective to remove therefrom gummy or resinifying constituents and to produce products of which the color is not only initially good but substantially permanent.

In prior copending applications, this applicant has disclosed and claimed the treatment of mineral oils of the general character above mentioned with various catalytic polymerizing or condensing agents dissolved in a solvent differing from the oil to be treated, but miscible therewith or soluble therein, this treatment being effective to polymerize resinifying or gum-forming constituents in the oil and enabling separation thereof in such manner as to produce oils of marked superiority as regards stability and other properties. In particular, the processes of said prior copending applications are directed to the treatment of motor fuels of the gasoline type resulting from processes of cracking heavy mineral oils and residua, such cracked motor fuels being characterized by relatively large content of unsaturates including polymerizing constituents that are responsible for the formation of gums or resins that manifest their presence in commercial motor fuels previously known in the art.

As examples of treating solutions employed in accordance with the processes of said prior application may be mentioned solutions of aluminum chlorid, zinc chlorid, or ferric chlorid in ordinary sulfuric ether (ethyl ether). Of these, the solution of zinc chlorid has been found to be most effective and suitable as a rule. The employment of aluminum chlorid is not generally so advantageous because of side reactions which sometimes occur with production of hydrochloric acid when moisture is present in the oil being treated, which is ordinarily the case. Ferric chlorid is not so rapid in its action as either of the foregoing reagents. Other solvents may also be employed, among which may be mentioned nitrobenzene, normal propyl alcohol, and ethyl acetate (acetic ether).

The general method of procedure in employing the solution in accordance with the disclosures of the aforesaid copending applications consists in adding the treating solution to the oil and allowing the polymerizing reaction to go on either at ordinary temperatures or at the higher temperatures involved in a re-distilling operation. In purifying a motor fuel fraction, for example, the most effective method is to mix the treating solution with the crude motor fuel and to re-distil to obtain a finished motor fuel.

The finished products obtained by the method of procedure generally described above are of excellent character both as regards color and stability; but in some cases, depending largely upon the particular character of crude petroleum or other mineral oil employed as starting material and upon other conditions of practical operation, the color or the resulting products, while good as already stated, is sometimes not quite up to the standard demanded in the trade.

It is the principal object of the present invention to so modify and improve the general methods of procedure disclosed in the prior copending applications aforesaid as to overcome this difficulty and incidentally to attain other advantages as will more fully hereinafter appear. In general, this object is attained by subjecting the mineral oil to be treated to the action of both a treating solution containing a polymerizing agent as above described and also a more or less granular or pulverulent solid material that will serve to provide a base or carrier upon which gummy or resinous polymers may collect. In addition, such solid material may further serve as a means of carrying the treating solution to all parts of the oil to be treated. Various kinds of solid material may be employed in practicing the invention, but it is of great advantage that whatever solid material be used possess high adsorptive powers. As examples of highly adsorptive solid materials that are eminently suitable in carrying on the present process, reference may be made to fuller's earth, pumice, silica-gels, and the like. By the conjoint use of such materials and treating solutions of the character above mentioned, it is found that the finished products obtainable from practically any crude oil material possess satisfactory color which, moreover, is permanent. Generally speaking it is especially to be noted that the use of such solid materials alone, although effective in some cases in improving color, does not give a color that is permanent; whereas by proceeding in accordance with the present invention, a permanently high-grade color is obtained. In the case of some oil products requiring special treatment to attain desired high grade and permanency of color, it is sometimes of advantage to subject it additionally to a sweetening treatment as, for example, by the use of "doctor solution" (litharge and caustic soda) or sodium hypochlorite, but the employment of such further sweetening treatment is unnecessary in the majority of cases.

In order to afford a more complete understanding of the principles of the invention, a specific embodiment of the new process will now be described in detail as applied to the treatment of a crude motor fuel fraction obtained by cracking or converting relatively heavy mineral oil into lower-boiling products. In this example, the employment of a solution of commercial zinc chlorid in ether will be assumed, although it is to be understood that other treating solutions of the character above described may be employed. It will also be assumed that fuller's earth is used as the granular solid material, fuller's earth possessing marked adsorptive properties and therefore being particularly well adapted for the purposes of the invention.

The crude motor fuel fraction to be treated is charged into a re-run still of ordinary type, and to the charge are then added fuller's earth and a solution of zinc chlorid in ether. The amount of fuller's earth employed need be only a very small percentage of the charge, amounting ordinarily only to from ½ to 1 per cent by weight of such charge. Assuming the employment of a zinc chlorid-ether solution, consisting approximately of 40 per cent zinc chlorid and 60 per cent ether by weight, the amount of such solution introduced into the still may amount, for example, to about 0.15 per cent by weight of the charge, it being understood of course that this percentage is merely typical and can be varied within reasonably wide limits. As a rule, however, it is unnecessary to employ more than 0.25 per cent of the treating solution although larger percentages do no harm. With reference to this treating solution, it may be further noted that it can be prepared by dissolving commercial granulated or fused zinc chlorid in ordinary ether. It is not essential that the zinc chlorid be strictly anhydrous, but on the other hand too large a water content reduces the effectiveness of its action as a treating agent. Therefore, in order to take account of the variations in water content characterizing different lots of commercial granulated or fused zinc chlorid, it has been found of advantage to employ as an ingredient of the zinc chlorid-ether solution, a small addition of plaster of Paris or other appropriate dehydrating agent. For example, an addition of plaster of Paris amounting to about 5 per cent, based upon the weight of the zinc chlorid, is found to work well in practice, this small percentage, which is of course susceptible of variation within the scope of the invention, being usually sufficient to take care of the variation in moisture content above referred to. This small addition of a suitable dehydrating agent seems to have the effect of standardizing the zinc chlorid as regards its content of water and its effectiveness when used in the present process. Similarly, when using aluminum chlorid or other catalytic salt, the use of plaster of Paris or other suitable dehydrating agent is of advantage for the same reasons.

It may be further noted that upon adding the zinc chlorid to the ether, a violet reaction immediately ensues indicating that a chemical reaction is taking place. As a rule, the solution is made up in the proportion of 3 pounds of zinc chlorid to 6 pounds of ether, and the loss of ether through volatilization eventually results in the final solution having roughly the content percentages above mentioned, namely, 40 per cent zinc chlorid and 60 per cent ether. A peculiarity of this solution is that whereas ether has an extremely high vapor tension, the zinc chlorid-ether solution has a very much lower vapor tension, so low in fact that the solution can be shipped in ordinary containers. This appears to be a further indication that a chemical reaction has taken place and that a zinc chlorid-ether complex of some kind has been formed that is in effect the polymerizing agent responsible for the resinifying or polymerizing effect produced upon certain constituents of the oil treated. Solutions of aluminum chlorid and ferric chlorid, respectively, in ether also possess similar characteriscs, including that of low vapor tension.

As stated, ordinary ether may be used as the solvent in the case assumed, that is, commercially available ether corresponding to the U. S. P. standard and therefore containing a very small percentage of water. This slight content of water is not disadvantageous but is rather an important advantage as it appears to promote or facilitate the reaction between zinc chlorid and ether and in doing so seems to serve a purpose not served by such water as may be contained in the zinc chlorid.

The still charge having been made up as above described, the charge is now distilled in the usual manner and the distillate obtained is a finished motor fuel which is usually of permanently high-grade color. It may be mentioned that in the trade a color is considered to be permanent where it holds as long as 30 days, exposed to daylight, and as long as a year in ordinary dark storage. This motor fuel requires no further treatment except where, as already pointed out, it is derived from certain peculiar crudes that yield a product which can advantageously be further subjected to a sweetening treatment with "doctor solution" or sodium hypochlorite, with which the motor fuel may be washed to finish it.

The residue remaining in the still and constituting as a rule around from 10 to 20 per cent by volume of the original charge is run off, and the above described treatment can then be applied to another charge of crude motor fuel. The aforesaid residue contains a large amount of deposited gummy or resinous polymers and coloring matter adhering to the fuller's earth, which may be removed from the liquid portion of the residue by filtration or settling. The fuller's earth may be recovered by burning off the deposited matter if desired and used over again. Or it may be treated with suitable solvents to recover the precipitated gummy matter which can be utilized for desired by-products. The pronounced action of the fuller's earth in taking up and holding the precipitated gummy matter and coloring matter is of great importance in preventing accumulation of said matter on the bottom of the still where it would be subjected to overheating and decomposition, with resultant damage to the refined motor fuel distillate sought.

Instead of adding the fuller's earth and treating solution separately to the charge in the re-run still, they may be first mixed together and the mixture then introduced into the still. This procedure has certain advantages in that in this way the fuller's earth, having initially adsorbed the treating solution to a large extent, it can act effectively as a mechanical carrier and distributer of the treating solution throughout the charge in the still. It is also feasible, instead of adding the treating materials to the charge in the still, to add them to the crude motor fuel in an agitating tank, for example, where thorough commixture is effected in any suitable manner and the mixture is then allowed to stand until the fuller's earth and the resultant insoluble polymers have settled out. This preliminary treatment may occur at ordinary temperatures, or the reaction may be hastened materially by heating by means of steam coils or the like. In either case, after settlement or filtration, the motor fuel may then be charged into the re-run still and distillation effected as before described. It will be found ordinarily that the residue in the still contains a certain proportion of polymers that remain in solution in the motor fuel after the treatment referred to. It is of course permissible and sometimes advantageous to have a small quantity of fuller's earth in the still in this case also. It is to be understood, furthermore, that in the case of some motor fuels or other products to be purified, it is feasible to effect the treatment without actual redistillation, said treatment in such case including merely mixing the solid adsorbent material and treating solution with the said product under conditions of time and temperature effective to accomplish polymerization, and then separating deposited polymers from the liquid to obtain a finished product.

What I claim is:

1. The process of refining a mineral oil which comprises subjecting a mineral oil to the conjoint action of solid adsorptive material and a polymerizing or condensing solution of a catalytic metal compound in a non-aqueous solvent miscible with said mineral oil, and separating resultant polymers and said solid adsorptive material from the treated mineral oil.

2. The process of refining a mineral oil which comprises distilling the same in the presence of an adsorptive solid material and a solution of a catalytic metal compound in a non-aqueous solvent miscible with said mineral oil, said solution having a polymerizing or condensing action on gum-forming constituents present in said mineral oil.

3. The process of refining crude motor fuel derived from mineral oil which comprises adding thereto conjointly small percentages of granular adsorptive solid material and a solution of a catalytic metallic halid in a non-aqueous solvent miscible with said motor fuel, and separating said solid material and resultant polymerized products from the motor fuel.

4. The process defined in claim 3, further characterized by the fact that fuller's earth is the adsorptive solid material used.

5. The process defined in claim 3, further characterized by the fact that fuller's earth is the adsorptive solid material used, and that said solution comprises zinc chlorid dissolved in ether.

6. The process of refining crude motor fuel derived from mineral oil which comprises adding thereto small percentages of fuller's earth and a solution of a catalytic metal chlorid in a non-aqueous solvent miscible with said motor fuel, and distilling the motor fuel to separate it from the fuller's earth and resultant polymerized products.

7. The process of refining mineral oil which comprises subjecting the same to the action of a condensing or polymerizing agent comprising a solution of a catalytic metallic salt in a non-aqueous solvent miscible with said mineral oil, said solution also containing an admixed dehydrating agent, and separating resultant polymerized products from the treated oil.

8. The process of refining mineral oil which comprises subjecting the same to the action of a condensing or polymerizing agent comprising a solution of zinc chlorid in ether, said solution containing admixed plaster of Paris, and separating polymerized products from the treated oil.

9. A composition useful in improving mineral oil and comprising a catalytic metallic salt dissolved in a non-aqueous solvent miscible with such mineral oil, said composition also including a dehydrating agent.

10. A composition useful for improving mineral oil and comprising a solution of a catalytic metallic halide in ether, together with admixed plaster of Paris.

11. A composition useful for improving mineral oil and comprising a solution of zinc chlorid in ether, together with admixed plaster of Paris.

In testimony whereof I hereunto affix my signature.

WILLIAM G. LEAMON.